(12) United States Patent
Yan et al.

(10) Patent No.: US 11,278,155 B2
(45) Date of Patent: Mar. 22, 2022

(54) AUTOMATIC CONTROL FUNCTION FOR WHIPPING CREAM

(71) Applicant: Vorwerk & Co. Interholding GmbH, Wuppertal (DE)

(72) Inventors: Wenjie Yan, Düsseldorf (DE); Maximilian Könnings, Zürich (CH); Maria Resende, Lisbon (PT)

(73) Assignee: Vorwerk & Co. Interholding GmbH, Wuppertal (DE)

( * ) Notice: Subject to any disclaimer, the term of this patent is extended or adjusted under 35 U.S.C. 154(b) by 277 days.

(21) Appl. No.: 16/308,232

(22) PCT Filed: Jun. 8, 2017

(86) PCT No.: PCT/EP2017/063984
§ 371 (c)(1),
(2) Date: Dec. 7, 2018

(87) PCT Pub. No.: WO2017/211963
PCT Pub. Date: Dec. 14, 2017

(65) Prior Publication Data
US 2019/0246843 A1 Aug. 15, 2019

(30) Foreign Application Priority Data
Jun. 10, 2016 (DE) .................. 10 2016 110 687.9

(51) Int. Cl.
*B22C 5/00* (2006.01)
*A47J 43/07* (2006.01)
*A47J 43/046* (2006.01)

(52) U.S. Cl.
CPC ......... *A47J 43/0716* (2013.01); *A47J 43/046* (2013.01)

(58) Field of Classification Search
CPC .................. A47J 43/046; A47J 43/0716
See application file for complete search history.

(56) References Cited

U.S. PATENT DOCUMENTS

| 5,539,288 A * | 7/1996 | Neijzen ............... A47J 43/04 318/432 |
| 2013/0168475 A1* | 7/2013 | Bohannon, Jr. ....... A23G 9/045 241/27 |

FOREIGN PATENT DOCUMENTS

| CN | 1830371 A | 9/2006 |
| CN | 104428990 A | 3/2015 |

(Continued)

OTHER PUBLICATIONS

Machine Translation "Hendrik Koetz, "Food Processor", Jun. 2014" [labeled as WO2014083021A1_desc_en] (Year: 2014).*

(Continued)

*Primary Examiner* — Anshu Bhatia
*Assistant Examiner* — Gregory Y Huan
(74) *Attorney, Agent, or Firm* — Rudy J. Ng; Bret E. Field; Bozicevic, Field & Francis LLP

(57) ABSTRACT

The present invention relates to a method for operating a food processor, where at least one processing device of the food processor is controlled, in a preparation mode, so as to at least partially automatically prepare food, and where a monitoring device performs an identification of temporally successive acquisition values at the food processor at least during the preparation mode, where the acquisition values are specific to at least one preparation parameter of the food processor, where at least one analysis information is determined dependent upon the temporally successive acquisition values, and a frequency distribution of the analysis information is identified by a time-dependent analysis, whereby an analysis result specific to a preparation state is determined, where dependent upon the analysis result, at least one control signal is emitted for influencing the preparation mode.

18 Claims, 4 Drawing Sheets

(56) References Cited

FOREIGN PATENT DOCUMENTS

| DE | 102008038783 A1 | | 2/2010 | |
|---|---|---|---|---|
| DE | 102013106691 A1 | * | 1/2014 | ............ A47J 27/004 |
| DE | 102013106691 A1 | | 1/2014 | |
| EP | 2394549 A2 | | 12/2011 | |
| FR | 2979440 A1 | * | 3/2013 | ........... H05B 1/0266 |
| WO | WO-2014083021 A1 | * | 6/2014 | .......... A47J 43/0716 |

OTHER PUBLICATIONS

Google machine translation for FR2979440A1 (Year: 2013).*
Google machine translation for "DE-102013106691-A1" (Year: 2014).*
Examination report No. 1 for Australian Application No. 2017277612 dated Apr. 24, 2020, 2 pages.
First Office Action for Chinese Application No. 201780030770.2 dated Apr. 21, 2021, with its English translation, 18 pages.
Office Action for European Application No. 17728561.6 dated Apr. 28, 2021, with its English summary, 3 pages.
Office Action for European Patent Application No. 17 728 561.6, dated Aug. 4, 2021, and its English summary, 5 pages.

* cited by examiner

AUTOMATIC CONTROL FUNCTION FOR WHIPPING CREAM

The present invention relates to a method according to the type defined more precisely herein. Furthermore, the invention relates to a food processor as well as to a computer program product as described herein.

Food processors that can prepare food in an at least partially automatic manner are known from the prior art. A food processor of this kind is disclosed for example in DE 10 2013 106 691 A1, the entire disclosure of which document is incorporated in this application.

A food processor of this kind comprises one or more processing devices which comprise a mixer for example. In this case the processing device can be controlled such that autonomous and/or at least partially automatic preparation is enabled. This also comprises in particular the execution of recipe steps by means of the food processor.

In this case, the at least partially automatic preparation takes place in particular in accordance with programming of the food processor, which, e.g. according to the recipe steps or the user setting, includes various control parameters for the control of the processing device. The programming of the food processor also includes certain specifications, for example, such as control parameters, dependent upon the food to be prepared. For example, preparing rice requires a different mixer speed and a different temporal mixing duration than preparing cream. The type of food is specified for example by the recipe or by the user of the food processor and set accordingly on the food processor. Depending on the type of food, the preparation is then carried out in accordance with a specified mixing duration and/or mixer speed that is optimal for preparing the food in question.

However, it is often problematic in this case that the optimal preparation and therefore the optimal values for the control parameters, such as the mixer speed and/or the mixing duration, are dependent on and influenced by a very large number of factors. Factors of this kind are for example the food characteristics (amount, percentage fat, manufacturer and the like) and/or the environmental conditions (such as the room temperature). In order to determine the optimal values for the control parameters it is therefore often not sufficient to use pre-stored values for the control parameters that were set depending on the food type, i.e. in a food-dependent manner. In particular, it is then often not possible to achieve comparable preparation results in the case of different requirements and environmental conditions. In this case, it is often not sufficient to take into account merely isolated factors, the costs and technical outlay for the sensor technology also being high.

An object of the present invention is therefore that of overcoming the above-described disadvantages at least in part. The object of the present invention is in particular that of allowing improved and/or simplified, at least partially automatic preparation of food. Furthermore, in particular preparation by means of the food processor for a food intended for preparation, i.e. in particular identifying the optimal control parameters for the food in question, with respect to the state and/or the type of the food. In this case in particular the structural complexity and/or the costs should be reduced.

The above object is achieved by a method as described herein, a food processor as described herein as well as a computer program product as described herein. Further features and details of the invention can be found in the relevant dependent claims, the description and the drawings. In this case, features and details that are described in connection with the method according to the invention of course also apply in connection with the food processor according to the invention and the computer program product according to the invention, and vice versa in each case, and therefore, with regard to the disclosure, reciprocal reference is always/can always be made to the individual aspects of the invention.

The object is achieved in particular by a method for operating a food processor, in which in a preparation mode at least one processing device of the food processor for at least partially automatic preparation of at least one and/or various foodstuffs is controlled. The control is carried out for example by means of a control device and/or by means of a control signal which is emitted by the control device and/or by a processing device. Preferably, the food processor comprises a monitoring device, which, at least during preparation mode, identifies successive acquisition values on the food processor, wherein the acquisition value are specific to at least one preparation parameter of the food processor and/or to the preparation of the food. It is preferably provided here that at least one analysis information is determined based upon successive acquisition values, and a time-dependent analysis of the analysis information for determining an analysis result specific to a preparation state is carried out. Preferably, the time-dependent analysis comprises identifying a frequency distribution (i.e. frequency analysis) of the analysis information, which particularly preferably also includes a histogram analysis. In this case, at least partly the steps which are also required for the determination of a histogram of the analysis information are carried out, for example. Preferably, dependent upon the analysis result, at least one control signal to influence the preparation process is emitted. In other words, by means of the time-dependent analysis of the analysis information, an analysis result is determined, which in particular permits conclusions on the state of the food during the preparation. To that end, the time-dependent analysis evaluates e.g. a plurality, in particular at least 2 and/or at least 4 and/or at least 10, of the identified acquisition values (and/or the values resulting therefrom, as the generated features), e.g. compares said values with one another, in order to preferably determine an analysis result. It is thus not necessary to exactly know the factors such as the food characteristics and environmental conditions because in particular the analysis result provides the necessary information in order to optimize the preparation. The preparation can preferably then be controlled on the basis of the analysis result, i.e. the preparation mode can be influenced so as to ensure the optimal preparation for the food. For example, a control parameter such as the temporal mixing duration is influenced and/or defined by the emission of the control signal. It is thus possible to determine the optimal control parameters and/or to influence the preparation accordingly on the basis of the food (to be prepared) that is provided for the preparation. The control signal is emitted for example by a processing device and/or by the monitoring device and/or by a control device and/or by electronics of the food processor. It is furthermore possible, for example, for the determination of the analysis information and/or the analysis and/or the determination of the analysis result to be performed by the processing device, preferably by means of arithmetic operations and/or signal processing.

Furthermore, it is in particular conceivable for the analysis result which is specific for the preparation state, i.e. in particular for the state of the food during the preparation, to be determined by means of time-dependent analysis. For example a characteristic of the food, such as the consistency and/or temperature and/or optical characteristics and/or acoustic characteristics is understood as this, which characteristics change during the preparation (i.e. during preparation mode). In this case, the analysis information and/or the acquisition values and/or the preparation parameter is/are preferably dependent on information determined at the food processor and/or control variables and/or influencing variables and/or a characteristic of the food processor and/or physical variable which are influenced by the state of the food. Within the context of the invention, the term "acquisition value" preferably refers to a value and/or measurement value of the acquisition variable that can be acquired (for example by means of a sensor), i.e. in particular a physical variable or measurement variable which is acquired in particular at the food processor, wherein the preparation parameter preferably is the acquisition variable. The identification of the acquisition values in particular comprises measuring (acquiring) the measuring variable, wherein it is possible, in this context, for "measuring" to be understood both as quantitative and as qualitative acquisition and therefore not necessarily needing to comprise defining a unit and/or quantitative statement regarding the measuring variable. The acquisition value may for example merely be a voltage value and/or a current value, for example a curve being analyzed by means of the time-dependent analysis and/or consulted for the analysis information, without specific comparison with a unit.

Within the context of the invention, the preparation parameter in particular denotes an acquirable (measurable) physical variable (such as the speed of the mixer) and/or a control variable (such as the motor signal) and/or influencing variable (such as the temperature) at the food processor, the preparation parameter preferably being (exclusively) indirectly influenced by the preparation state, such as the motor current of an electrical motor for driving the mixer. For example, a change in the consistency of the food brings about a changed (mixing) resistance on the mixer and thus indirectly influences the motor current. Thus, the time course of the measured values or acquisition values is preferably dependent on a course of the mixing resistance of the mixer. This has surprisingly resulted in the advantage that a time-dependent analysis, in particular of the temporally successive acquisition values, can provide the essential information for optimizing the preparation, in particular for controlling the processing device. In particular, a completion time for the food can advantageously be determined on the basis of the time-dependent analysis of the analysis information.

The time-dependent analysis is preferably an analysis of temporally successive (acquisition) values, preferably a time series. The time-dependent analysis particularly preferably comprises statistical methods for predicting the future development of the time series and/or acquisition values. In this case, a prediction provides the advantage that the control signal can be emitted in due time, despite a long latency period, i.e. a delay between the preparation state occurring and the corresponding analysis result being provided. The time-dependent analysis therefore provides the advantage that a future completion and/or other desired state in the preparation of the food can be identified or determined reliably and early. This makes it possible to influence the preparation early on, in order to be able to deactivate the preparation mode in due time for example. In other words, the control signal is preferably used to maintain a preparation state which temporally follows the preparation state for which the particular analysis result is specific. The time-dependent analysis, which is also performed in a time-limited and/or real-time capable manner for example, can thus perform and/or initiate the influencing of the preparation mode and/or the determination of the preparation state and/or the prediction of the desired completion time before the completion time has been temporally reached and/or exceeded.

It is furthermore conceivable for the food processor to comprise at least one and/or at least two and/or at least three and/or more processing devices which preferably each comprise at least one processing tool, preferably at least one mixer and/or at least one heating element. It may furthermore be provided that the processing device comprises at least one electric motor (electromotor), preferably for operating the mixer. In addition, the processing device can preferably comprise at least one temperature sensor and/or at least one scales and/or at least one current sensor and/or at least one voltage sensor, wherein it also is possible for the processing devices to be designed differently from one another in each case. For example, a first processing device is provided which comprises the mixer, and a second processing device is provided which in particular comprises the heating element and/or the temperature sensor. Furthermore, the food processor preferably comprises a housing which comprises a holder for a mixing vessel. The mixing vessel can for example be closed by a lid and in particular comprises a handle. The food to be prepared can in particular be poured into and/or received in the mixing vessel. The mixer and/or the heating element are preferably arranged in the inside of the mixing vessel, and can in particular act on the food in the mixing vessel. It may also be possible for the food processor to comprise at least one control panel which preferably comprises at least one display, preferably a touchscreen. In this place, the display is used for example as an input and/or output means for a user of the food processor. Further input means such as a rotary control and/or a set switch and/or the like may optionally also be provided. Via the control panel, in particular via the display in conjunction with the other input means, a user of the food processor can, for example, set and/or activate and/or deactivate operating parameters such as the mixer speed and/or the heating temperature and/or the duration of the mixing process (mixing duration) and/or various programs for the preparation It is also conceivable for the control panel and/or the food processor to be designed such that the operating parameter to be set and/or a recipe selection can be selected using the touchscreen and/or such that the value for the selected operating parameter and/or a specific recipe can be set/selected using the further input means. It is furthermore possible in particular for the user to be able to set the food (i.e. in particular the type of food) and/or the preparation and/or the recipe for the food processor by means of the control panel. It may furthermore be possible for the user to be able to activate and/or deactivate the preparation mode of the food processor, in particular using the control panel and/or the further input means. In preparation mode, for example the mixer and/or a motor for operating the mixer is started, preferably for a specified temporal mixing duration. The preparation mode for example can be deactivated at the latest following said specified mixing duration, as a result of which the operation of the mixer and/or of the motor is also ended. Preferably, when preparation mode is activated the mixer speed is greater than 0 and when preparation mode is deactivated the mixer speed is 0. In this case, the deactivation of the preparation mode and/or the setting of operating parameters such as the mixer speed and/or the duration of the mixing process can take place for example manually and/or (partially) automatically, for example in a program-controlled and/or recipe-dependent manner (for example on the basis of the recipe selected) and/or in a food-dependent manner (e.g. on the basis of the state of the food). This thus in particular allows for the at least partially automatic preparation of the food. It is conceivable for the preparation parameter (and/or the control parameter) to correspond to the operating parameter and/or to comprise the operating parameter, and/or for the acquisition value to be dependent on the operating parameter. Each recipe and/or each food that is set preferably comprises at least one (digitally stored) program for the preparation process.

The food processor and/or a mobile device (such as a mobile memory or recipe chip) for the food processor preferably comprises a non-volatile data memory unit in which pre-set operating parameters and/or programs and/or recipes are stored which are selected for example on the basis of input by the user. In this case, said operating parameters in particular also comprise control parameters, for example the mixer speed and/or the values for electrical parameters for controlling the motor of the mixer, in order to achieve a specified mixer speed. In this case, the preparation parameters preferably comprise the operating parameters and/or control parameters and/or further parameters at least in part, which parameters are relevant for the preparation. In particular, the preparation parameters each comprise properties of the food processor and/or the control and/or acquisition variables and/or physical variables that are relevant for the preparation of the food and/or that are dependent on a preparation state. Thus, the preparation parameter is e.g. a motor signal of the motor of the mixer, which depends upon the control of the motor and/or on the rotary speed and/or the torque of the mixer.

Within the context of the invention, the preparation state preferably is to be understood as the state of the food during preparation and/or characteristics of the food, such as an optimal future completion time of the preparation and/or of the food. The analysis result is therefore preferably specific for the preparation state, i.e. the analysis result in particular makes it possible to conclude the state of the prepared food at the timepoint the measurement values were identified and/or how the preparation can be influenced in order to achieve an optimal result. For example, a completion time for the preparation can be estimated on the basis of the analysis result and the duration of the mixing process can thus be adjusted and/or the mixer speed can be adjusted. The speed may for example be and/or vary in a range of from 10 rotations per minute (rpm) to 600 rpm, preferably between 40 rpm and 500 rpm. The mixing duration can for example be set in a range between 10 seconds and 1000 seconds, preferably 20 seconds to 400 seconds.

It may in particular be possible for the preparation to be performed on the basis of input by a user of the food processor and/or programming of the food processor. In this case, it is conceivable for example for the user to set on and/or input into the food processor the type of food that is to be prepared. This may for example also take place by means of the user selecting a particular recipe. Subsequently, it may be possible for a particular program and/or particular values for operating parameter and/or control parameters for the at least partially automatic preparation by the food processor to be loaded and/or set and/or read out on the basis of the food type. The programs and/or values are for example stored digitally in a non-volatile memory unit, in particular of the food processor and/or of a mobile device. In this case, the food and/or the food type is for example cream and/or rice and/or flour, and therefore for example a first food, in particular cream, and/or a second food, in particular rice, can be provided for the preparation and/or according to the programming. Different time-dependent analyses and/or different parameterization for the time-dependent analysis can also be used, depending on the type of food. It may also be possible for different acquisition variables to be acquired and/or for characteristic curves of the analysis information and/or of the analysis result to be specified and/or to be able to be read out and/or compared on the basis of a food selected by the user, said variables and/or curves being specific for the particular food in each case. It is thus possible, for example, for a first curve of the analysis information or of the analysis result to be provided and/or evaluable for a first food, said first curve being characteristic of said first food, and for a second curve of the analysis information or of the analysis result to be provided and/or evaluable for a second food, said second curve being characteristic of said second food. The evaluation of the corresponding characteristic curve, e.g. by comparing the characteristic curve with the identified curve of the measurement values and/or with the analysis result then enables to draw conclusions on the state of the food in question, with the result that, for example on the basis thereof, the control signal is emitted. For example, in the case of cream the preparation mode is influenced, in particular deactivated, when an increasing curve of a motor signal of the mixer is ascertained by the time-dependent analysis and/or on the basis of the analysis result of the time-dependent analysis. In the case of rice, the preparation mode is preferably influenced, in particular deactivated, when a falling curve of the motor signal is acquired by the time-dependent analysis and/or on the basis of the analysis result of the time-dependent analysis. The advantage of this is that different foods can be optimally prepared in a flexible manner using the time-dependent analysis.

Advantageously, it can be provided in the context of the invention that at least one of the following steps is performed, preferably successively or in any order:
a) filtering the identified acquisition values to achieve a smoothing (of the curve of the identified acquisition values, preferably by a low-pass filter,
b) generating at least one feature based upon the, in particular filtered (identified) acquisition values, wherein preferably a feature evaluation of the at least one generated feature is performed,
c) determining the analysis information based upon the generated features and/or based upon the, in particular filtered, (identified) acquisition values,
d) performing the time-dependent analysis of the analysis information, so that, dependent upon a time course of the (determined and/or filtered and/or unfiltered) acquisition values, the analysis result is determined,
e) determining a positive or negative decision result on the basis of the analysis result, the positive decision result preferably being determined only when the analysis result indicates a future specified preparation state,
f) outputting the control signal, when the determined decision result is positive and/or the determined future preparation state, in particular a completion time of the food, is indicated.

In this case it is possible in particular for at least one of the following filtering methods to be carried out individually or in combination (directly or indirectly) on the identified acquisition values (in particular measurement values) in order to filter the identified acquisition values, in particular an acquisition value curve of the temporally successive acquisition values:

median filter
moving average
first and/or second and/or at least fourth-order low pass filter.

The filtering according to step a) and/or the generation of the feature according to step b) and/or the determination of the analysis information according to step c) and/or the time-dependent analysis according to step d) preferably comprises (numerical) determination of a difference and/or of a gradient, and/or a comparison of (e.g. adjacent) filtered and/or unfiltered identified acquisition values. In this case it is conceivable for the filtering and/or the determination of the analysis information, and/or the generation of the features to be performed on the basis of the time curve of the acquisition values, i.e. on the basis of for example at least 2 and/or at least 4 and/or at least 5 and/or at least 10 and/or at least 100 (adjacent, identified) acquisition values in each case. The time-dependent analysis preferably evaluates the time curve which may for example comprise acquisition values that were each identified in a time interval of more than at least 1 s and/or at least 2 s and/or at least 5 s and/or at least 10 s (by means of the acquisition). In particular, steps a) to f) can be carried out in temporal succession or in any desired sequence and/or repeatedly. In this case, at least one of said steps a) to f) and/or the filtering and/or the can for example be software- and/or computer-implemented and/or performed electronically and/or by means of an electronic, in particular integrated, circuit. It may in particular be possible for digital and/or discrete acquisition values to be evaluated for the filtering and/or time-dependent analysis. Alternatively or in addition it may be possible for the time-dependent analysis and/or at least one of the steps a) to f) to be carried out repeatedly and/or cyclically, in particular over the entire preparation process, in order to determine the analysis result repeatedly and/or cyclically in each case. In particular it may be possible for the time-dependent analysis and/or at least one of the steps a) to f) to be carried out at least once per second and/or at least ten times per second and/or at least one hundred times per second during the preparation mode, i.e. during the preparation. It is furthermore possible, for example, for at least one of the steps a) to f) to be carried out by a processing device at least in part, preferably by means of arithmetic operations and/or signal processing. In this case, said steps ensure that the preparation of the food can be influenced reliably in order to achieve optimal preparation results.

Furthermore, it can be provided that the generating of the at least one feature includes at least one filtering method and/or consistency check of the acquisition values and/or features. In particular threshold values and/or (further) frequency analyses can be conducted for the consistency check. Furthermore, it is conceivable that the time-dependent analysis, in particular the identification of the frequency distribution, is carried out based upon the identified and/or filtered acquisition value and/or based upon the generated features. Preferably, the analysis result indicates a future determined preparation state, e.g. a completion time, at which the preparation process must be deactivated for an optimum preparation result. This has the advantage that by the time-dependent analysis, the point in time at which the preparation must be optimally completed, can be determined in good time.

It is furthermore conceivable for at least one threshold value to be evaluated, in particular in at least one of the steps a) to f), in particular in order to check the plausibility of the analysis result, preferably at least one comparison value, such as at least one identified and/or filtered acquisition value and/or at least one generated feature and/or the analysis result and/or a temporal mixing duration being compared with the threshold value. The threshold value may for example comprise an upper and a lower threshold value, i.e. a threshold value range defined thereby. For example, it may be provided for a positive decision result to be determined and/or for a control signal for deactivating the preparation mode to be emitted only if the comparison value is less than the upper threshold value and/or greater than the lower threshold value. A first and at least one second threshold value may optionally also be provided. In other words, for example a decision is carried out, i.e. the decision result is determined, and/or a positive decision result is determined and/or taken into account only if the acquisition value and/or the generated feature is lower than an upper first threshold value and/or greater than a lower first threshold value. Preferably (as an additional condition), the decision is carried out and/or a positive decision result is determined and/or taken into account only if the mixing duration is less than an upper second acquisition value and/or greater than a lower second threshold value. As a result, the period of time for carrying out the decision is thus defined by the second threshold value, wherein the threshold values for example are empirically defined and/or are food-dependent (i.e. for example defined on the basis of a food selected and/or set by the user). The threshold values are stored in a digitally persistent manner, for example in a non-volatile memory unit such as a ROM (read only memory) or a flash memory, and can be read out for a corresponding food. The mixing duration can for example be identified in that an (electronic) timer is started when the preparation mode is activated and/or when the mixer speed is increased, and/or is read out when the acquisition value are identified and/or during at least one of the steps a) to f). It is thus possible to reliably check the plausibility of the analysis result. In this case, the first and/or second and/or upper and/or lower threshold value can for example be in a range between 1 second and 5000 seconds, in particular 10 seconds to 1000 seconds, preferably 20 seconds to 400 seconds. The threshold values can preferably be defined empirically in that the (lower) threshold value and/or a (lower) first and/or a (lower) second threshold value specifies the particular value or the mixing duration at which (defined empirically) the desired preparation state (e.g. the desired consistency of the food) occurs at the earliest. Furthermore, the threshold values can preferably be defined empirically in that the (upper) threshold value and/or an (upper) first and/or an (upper) second threshold value specifies the particular value or the mixing duration at which (defined empirically) the desired preparation state (e.g. the desired consistency of the food) occurs at the latest. In addition to the threshold values, in particular also further identified values such as temperature values and/or weight of the food can be evaluated for the plausibility check. In particular, the plausibility check is performed at the latest when a decision is carried out and/or a positive decision result is output only if the plausibility check is positive, i.e. the limits specified by the threshold values are adhered to.

It may be advantageous if, within the context of the invention, the time-dependent analysis comprises a time series analysis, preferably a (statistical) evaluation of the frequency distribution, for this purpose in particular the analysis information and/or the identified acquisition values and/or the frequency distribution are temporally buffered, the time-dependent analysis and/or the time series analysis preferably are performed in a real-time capable manner. The term "real-time capable" preferably refers to the fact that the analysis result is determined by the time-dependent analysis at the latest within a predefined maximum time period. A "soft" or alternatively also "firm" real-time requirement is thus preferably provided in preparation mode in order that the preparation mode can be influenced in due time. According to the soft real-time requirement, the analysis result is processed further or the decision result is positive only if the predefined maximum time period is adhered to and/or is not reached. In order to ensure particularly fast processing, temporal buffering is preferably provided, in particular by means of a fast cache memory. The time series analysis for example comprises performing a frequency analysis and/or an autocorrelation function and/or an interference statistical analysis and/or a trend analysis and/or an analysis of a difference or rise in the temporal acquisition value curve.

Preferably, in the time-dependent analysis and/or in the determination of the frequency distribution (frequency analysis), an evaluation of analysis values of the analysis information is carried out. The analysis values of the analysis information preferably comprise at least one of the following values:
  the filtered and/or non-filtered acquisition value,
  the temporal course of these acquisition values over a certain time interval,
  the generated feature,
  a difference of temporally adjacent acquisition values, in particular of the filtered and/or non-filtered acquisition values.

Furthermore, in the time-dependent analysis and/or for the evaluation and/or determination of the frequency distribution of the analysis information, i.e. in particular of the analysis values, at least one of the following steps can be carried out, in particular successively or in any order:
  subdividing the analysis values into classes, wherein the classes respectively comprise value ranges, in particular a predefined constant or variable value range width,
  comparing the analysis values with the value ranges of the individual classes,
  assigning the analysis values (in particular dependent upon the comparison) to the respectively corresponding classes, wherein preferably each analysis value is e.g. assigned to the class in the value range of which class the analysis value lies,
  determining the frequency and/or frequency density, in particular of the assignments per class, i.e. in particular of the frequency of the occurrence of analysis values that are arranged to a certain value range (e.g. a certain class), wherein preferably the determination of the frequency is carried out for each of the classes,
  identifying the frequency distribution throughout the classes (based upon the determined frequencies and/or analysis values assigned to the classes),
  determining a characteristic value of the frequency distribution, in particular of a focus and/or a maximum of the frequency distribution,
  determining a (temporal) course of the characteristic value, preferably of the focus.

In particular, these steps are being repeated at least partially in a cyclic manner during the preparation mode, so that a course of the relative frequency and/or of the frequency density and/or of the characteristic value or of the focus can be determined. Preferably, for the time-dependent analysis and/or the decision process, an evaluation of the temporal course of the characteristic value, in particular of the focus (of multiple frequency distributions) can be carried out. In this case, the course of the characteristic values is particularly preferably dependent upon the preparation state and/or on the food during the preparation, and can thus serve for optimization of preparation. The characteristic value or focus depends e.g. on the fact which of the classes includes the maximum frequency or frequency density, or most of the analysis values. Preferably, the analysis result is determined dependent upon the course of the characteristic value. This achieves the advantage that the preparation can be influenced in an optimum manner, and in particular an optimal completion time, e.g. for the preparation of whipped cream, can be determined. The evaluation of the temporal course of the characteristic value, in particular of the focus, of the frequency distribution, can be effected, for example, in that the temporal course is compared with a temporal course pattern and/or a temporal course pattern of the course is detected. The temporal course pattern includes, for example, a characteristic temporal course of the characteristic value (e.g. of the focus) toward higher classes with higher value ranges and, in particular subsequently back to smaller classes with smaller value ranges, and/or vice versa. For example, a first course pattern for a first food, e.g. whipped cream, and a second course pattern for a second food, e.g. rice or pasta, can be pre-stored and/or be selected dependent upon the set food.

It can optionally be possible that the time-dependent analysis carries out the identification of the frequency distribution, in particular based upon the identified acquisition values and/or a generated feature in order to determine a trend of a temporal course of the acquisition values that indicates a future determined preparation state. Alternatively or additionally, it can be provided that the time-dependent analysis includes a calculating a different of temporally adjacent acquisition values and/or features. In addition, it is in particular conceivable certain patterns are recognized in the frequency distribution and/or in the analysis information by means of the time-dependent analysis, wherein the respective patterns in particular depends upon the type of the food and/or the preparation. In particular, use of the time-dependent analysis provided the advantage that important time points and/or trends can be recognized at an early stage in the preparation of food.

Another advantage can be achieved in the context of the invention if the analysis information is evaluated in a time-dependent manner by means of the time-dependent analysis in such a way that at least one (first) value of the analysis information is compared with at least one second value and/or with all further values and/or with a comparison specification (of the analysis information), in particular a temporal course pattern, wherein the values are determined from one of the following data:
  at least one filtered acquisition value,
  the at least one unfiltered or identified acquisition value,
  at least one feature generated from the acquisition values.

Preferably, it is likewise possible to evaluate a gradient of the acquisition values or of the acquisition value course and/or average values and/or the like by the time-dependent analysis. Preferably, the (first and/or second and/or further) value of the analysis information corresponds to an analysis value for the determination of the frequency distribution. The comparison specification particularly preferably comprises a predetermined pattern, in particular a temporal course pattern, and/or a predetermined characteristic course of the analysis information and/or frequency distribution (in particular of a characteristic value or focus of the frequency distribution) and/or a specification pre-stored in a non-volatile data memory unit, and/or the like. The comparison specification is, for example, selected dependent upon a selected (set) food. Optionally, the comparison specification includes reference values for a histogram and/or food-dependent and/or preparation-dependent) patterns, in particular a temporal course pattern, and/or comparison values. The time-dependent analysis preferably evaluates the analysis information, i.e. the filtered acquisition values and/or unfiltered acquisition values and/or generated features, wherein, to that end, e.g. a temporal course of the acquisition values and/or generated features is evaluated e.g. in a certain acquisition time period and/or compared to a pattern. In particular the filtering of the non-filtered acquisition values results in the filtered acquisition values here. In this case, the time-dependent analysis enables that an analysis result can reliably be determined, which indicates a future property and/or consistency of the prepared food.

In another option, it can be provided that the generation of a feature is effected based upon the identified acquisition values, in particular by stochastic methods and/or time-dependent calculations.

The generation of the feature includes the calculation or a time difference and/or a variance and/or at least one local maximum and/or a trend (in relation to a drop and/or a rise) of the acquisition values and/or of a gradient of the acquisition values and/or of average values. As a result, a reliable and meaningful determination of the analysis result is possible. Furthermore, it can be provided that in the time-dependent analysis and/or the generation of features and/or the filtering and/or the decision process, a timer or a time or a clock is read-out electronically, in order to determine the mixing duration and/or perform a comparison with a maximum time duration.

It is further advantageous if, in the context of the invention, the acquisition values are acquired by the acquisition of the at least one preparation parameter of the food processor, wherein the preparation parameter includes at least one of the following parameters:
  a measuring variable, which depends upon a consistency of the prepared food and/or on a mixing resistance of a mixer of the food processor, in particular in the preparation mode,
  a rotary speed of the processing device, in particular of a mixer,
  a parameter of a drive, in particular of a motor of the drive, in particular a motor signal,
  a motor signal, in particular a motor current, which preferably depends upon a torque of the mixer and/or a mixing resistance,
  a temperature, which in particular is acquired at a prepared food in the food processor,
  a measurable parameter at the prepared food, which in particular serves to prepare whipped cream and/or depends upon a mixing resistance.

The measurement and/or identification of the acquisition values occurs e.g. continuously or in a time-discrete manner, wherein in particular the preparation parameter forms the measuring variable. In particular, it is conceivable that the preparation parameter at least partially correspond to the control parameters or operating parameters. In this case, the motor is in the form of an electric motor. Preferably, control of the at least one processing device of the food processor during the preparation mode is effected by influencing the preparation parameters and/or control parameters. In this way, for example dependent upon a set feed (e.g. a set type of food) and/or preparation, the rotary speed and/or the motor current can be controlled in such a way when the preparation mode is activated that the preparation state is changed. For example, in the preparation whipped cream by the food processor, the preparation parameter temperature and/or weight and/or the motor signal can be acquired and/or be monitored continuously or in a time-discrete manner during the preparation mode (i.e. while whipping the cream). In this case, e.g. by the development and/or time-dependent analysis of the analysis information (which particularly depends on the motor signal), the point of time when the cream will reach the optimum consistency can be predicted at an early stage. In particular the motor signal depends on the consistency of the prepared food during the preparation mode. In particular, for the calculation of the analysis result, a maximum time period is provided, which amounts to e.g. at most 1 second, or at most 5 second, or at most 10 seconds. Thus, the completion time can be identified on time before the cream exceeds the optimum state, for example.

Preferably, it can be provided that the acquisition for identifying the acquisition values, in particular as or by acquisition and/or measurement, is carried out at an electronic component of the food processor, in particular at a drive of the processing device, and/or the acquisition values are acquired for electric parameters of the food processor, in particular for a motor signal of the drive. In this case, the motor signal may include the motor current and/or the motor voltage and/or the rotary speed of the motor and/or the speed of the motor and/or the torque of the motor (i.e. of the electric motor). Thus, a reliable determination of the preparation state is possible.

A further advantage can be achieved in the context of the invention if a plausibility-check is done, in particular based upon at least one empirically identified threshold value, in particular for determining the decision result, wherein preferably the threshold value is selected dependent upon a food provided for preparation, in particular automatically. In this case, in particular first and second threshold values and/or upper and lower threshold values can be provided. In particular, it can be provided that the influencing of the preparation mode is suppressed if, at the time that the analysis result exists, the duration of the activated preparation mode is shorter that the (predefined e.g. upper second) threshold value, or significantly shorter than in a normal process. To that end, in particular when activating the preparation mode, an (electronic) timer is started to identify the duration of the activated preparation mode and/or of the preparation. Thereby, it can be avoided, that in case of a false result, the preparation is stopped too early.

Furthermore, it can be provided in the context of the invention that a trend and/or a prediction of the identified acquisition values and/or features, in particular of a generated feature, and/or the frequency distribution, is identified, preferably in a feature evaluation of the feature and/or in a time-dependent analysis. To that end, e.g. a regression analysis, in particular a linear regression, and/or a variance analysis, and/or at least one/stochastic) trend model can be used. In this case, the trend preferably comprises a falling and/or a rising trend of the acquisition values and/or of the generated features, e.g. dependent upon the type of the food and/or the preparation. The prediction in particular comprises methods for predicting the further temporal course of the frequency distribution, in particular of a characteristic value, e.g. a focus, of the frequency distribution, and/or of the acquisition values and/or of the features, wherein, to that end, in particular a linear prediction and/or an adaptive prediction is employed to that end. Subsequently, this predicted course can be compared with a comparison specifications, for example, in particular with a pattern. This achieves the advantage that an analysis result can be determined in a particularly reliable manner, which indicates the preparation state.

It can be of further advantage that the decision result is determined to be positive only in the event that a predetermined temporal course pattern is detected, in particular a continuing rise or drop, preferably of the acquisition values and/or at least one characteristic value of the frequency distribution, in particular (a temporal course) of a focus of the frequency distribution. Alternative or additionally, it can be provided that the temporal analysis is carried out only in the event that (in particular in a feature evaluation) the predetermined temporal course pattern is detected, preferably a trend such as the continuing rise and/or drop. The rise and/or drop relates particularly preferably to the course and/or the difference of the acquisition values and/or generated features. Preferably, the feature is generated in that (possibly among others) the difference between adjacent identified and/or filtered acquisition values is calculated. Furthermore, the generated feature can also comprise a long term course of the slope of the acquisition values. The difference between adjacent acquisition values is preferably identified in that (temporally) adjacent acquisition values are compared numerically with one another. For the time-dependent analysis and/or a filtering of the identified acquisition values and/or for the generation of at least one feature, e.g. an (electronic) processing device of the food processor can be used, which at least partially numerically performs time-dependent analysis and/or filtering and/or the generation of the features. For example, the feature evaluation includes the identification of the frequency and/or the verification of conditions for certain features, in particular for certain time intervals, e.g. of a continuing rise or drop. It is likewise possible that threshold values are used to check the conditions, for example.

Furthermore, it is conceivable that the predetermined temporal course pattern is selected dependent upon a food provided for preparation, in particular automatically, in particular based upon a user input and/or a memory connected with the food processor. The memory can be in the form of a non-volatile memory and/or a mobile memory and/or a memory integrated in the food processor. In particular, the memory is connected to the processing device in such a way that data digitally stored in the memory are readable and/or writeable by the processing device. For example, a comparison specification and/or the temporal course pattern is digitally and persistently stored in the memory. Thus, e.g. by user input, the type of food and/or the type of preparation is set, and thereby the food provided for preparation (i.e. to be prepared) is selected. Depending upon this selection, a course pattern and/or comparison specification assigned to the type of preparation and/or the food can be read from the memory and/or be considered for the evaluation of the analysis result. The comparison specification also includes threshold values and/or characteristic courses, for example. In particular, the decision result is positive, or the positive decision result is considered, and/or a control signal is emitted only in the event that the considered course pattern and/or the comparison specification is detected in the analysis result and/or a plausibility-check by means of at least one threshold value is positive.

It is in particular conceivable that a temporal course and/or a certain temporal pattern and/or a trend of the frequency distribution (in particular of a characteristic value or focus of the frequency distribution) is evaluated, in particular to determine a decision result, wherein in particular a positive decision result is identified in a change of a trend, and a negative decision result is identified in a lasting trend. Preferably, it is conceivable that as long as the characteristic value, in particular the focus, or the frequency distribution, moves rightward (rising), a negative decision result is identified, and if the characteristic value, in particular the focus, or the distribution, subsequently moves to the left again (falling), a positive decision result is determined, or vice versa. Such a temporal pattern is defined differently, e.g. by the comparison specification, for different foods. Thus, depending on the food, e.g. an assigned pattern can be read-out and be considered as a comparison specification for the decision making and/or time-dependent analysis. Thus, the preparation state can be reliably predicted. The focus of the frequency distribution corresponds e.g. to the maximum of the frequency distribution and/or depends upon the maximum and/or of the individual values of the determined frequency for different classes.

It can for example be provided that, in the preparation mode, the processing device comprising a mixer for the at least partially automatic preparation of whipped cream is controlled. Alternatively or additionally, it is conceivable that, according to the method according to the invention, in particular a mixer, is used for the at least partially automatic preparation of at least one of the following foods:

pasta rice whipped cream dough sauces and/or emulsions, such as mayonnaise ice mass.

It can be provided here that a user of the food processor sets the food to be prepared, e.g. via a control panel. The user settings e.g. make sure that the food processor, in particular the processing device and/or the time-dependent analysis, is parametrized in a food-dependent manner. Thus, it is conceivable, for example, that the processing device is controlled to at least partially automatically prepare a first food, e.g. cream and/or the like, according to a first user setting, and is controlled to (at least partially automatically) prepare a second food, e.g. rice and/or pasta and/or the like, according to a second user setting. It can be provided here that for this purpose the parametrization of the time-dependent analysis and/or the evaluation of the analysis result and/or the comparison specification and/or the predetermined temporal course is modified dependent on the respective user setting, in particular on the type of food (e.g. rice or pasta or whipped cream), in order to achieve a food-specific preparation. For example, by means of the time-dependent analysis, a first comparison specification, such as a first predetermined course pattern, is detected in a first user setting, and a second comparison specification, such as a second predetermined course pattern, is detected in a second user setting. The first comparison setting preferably is adapted to a first food, and/or the second comparison specification is adapted to a second food. The first comparison specification preferably is suitable to represent a rising motor signal, in particular a rising motor current (in particular of a drive of the mixer). In this case, an increase of the mixing resistance of the mixer due to a different consistency of the first food can be detected by the time-dependent analysis based upon the first comparison specification. The second comparison specification preferably is suitable to represent a dropping motor signal, in particular a decreasing motor current (in particular of the electric motor of the drive of the mixer). Based upon the second comparison specification, e.g. a decrease in the mixing resistance of the mixer due to the different consistency of the second food can be detected by the time-dependent analysis.

The invention also relates to a food processor comprising at least one processing device and at least one monitoring device, wherein in a preparation mode, the processing device can be controlled to at least partially-automatically prepare food, and wherein an identification of in particular temporally successive acquisition values at the food processor can be carried out by the monitoring device at least during the preparation mode, wherein the acquisition values are specific to at least one preparation parameter of the food processor. It is provided here that at least one analysis information can be determined by the monitoring device dependent upon the temporally successive acquisition values, and a frequency distribution of the analysis information can be identified by a time-dependent analysis, whereby an analysis result specific to a preparation state can be identified, wherein, dependent upon the analysis result, at least one control signal can be emitted to influence the preparation mode. As a result, the food processor according to the invention comes with the same advantages as have been described in relation to a method according to the invention. In addition, the food processor according to the invention, in particular a controller of the food processor, can be suitable to be operated in accordance with a method according to the present invention. In this case, the control signal is emitted e.g. by a processing device and/or by the monitoring device and/or by the controller and/or by an electronics of the food processor. Furthermore, it is conceivable that the analysis and/or the method according to the invention can at least partially be carried out by the controller and/or by the monitoring device and/or by the processing device. The control signal can be an electric, in particular a binary and/or electronic signal, which serves for the communication between electronic components and/or for the internal processing in the processing device and/or for the controlling of electronic components. The controller can, in particular, comprise the monitoring device and/or further components (e.g. arranged in a distributed manner as an electric and/or electronic system) of the food processor according to the invention. In particular, the controller is electrically connected to the processing device.

It can furthermore be possible for the processing device to comprise at least one drive and a processing tool that can be operated by the drive, in particular a mixer of the food processor, and in particular for the monitoring device to be electrically connected with the drive to determine the acquisition values. The monitoring device in particular comprises an acquisition device in order to identify to acquire acquisition values at the drive means for example. For this purpose, the monitoring device can also comprise at least one or more sensors which are integrated in the food processor and/or arranged on the food processor. In this case, the sensor and/or the sensors can be designed for example as temperature sensors and/or voltage sensors and/or current sensors and/or speed sensors and/or torque sensors. Accordingly, the acquisition values are voltage acquisition values and/or current acquisition values and/or torque acquisition values and/or speed acquisition values and/or temperature acquisition values. This is advantageous in that the relevant acquisition values can be identified in a reliable manner.

According to a further advantage, it may be possible for the processing device and/or the monitoring device to be integrated in the food processor, and in particular that the identification of the acquisition values takes place directly by means of acquiring (measuring) the acquisition variables at the processing device inside the food processor. For example, the processing device and/or the monitoring device may be arranged inside a housing (and/or on the housing at least in part) of the food processor and/or may be rigidly connected to further components of the food processor. The acquisition can be effected for example by means of a motor current of a motor of a mixer of the food processor being measured. A voltage tap and/or a shunt resistor for example, may be provided on an electrical line of a drive means of the food processor in order to identify the acquisition values, for example. The advantage of this is that the acquisition values can be identified, and thus a preparation state can be identified, in a simple manner.

It is furthermore conceivable for the monitoring device to comprise an electrical and/or electronic processing device, and/or for the processing device and/or the monitoring device to comprise at least one electronic component. The electronic component for example comprises a microprocessor and/or a digital signal processor and/or a non-volatile memory and/or an application-specific integrated circuit (ASIC) and/or a field-programmable gate array (FPGA) and/or the like. This allows for the time-dependent analysis to be performed in a quick and reliable manner.

The invention also relates to a computer program product for operating a food processor, in particular a food processor according to the invention. In this case, the computer program product is intended to be configured to carry out a method according to the invention. As a result, the computer program product according to the invention provides the same advantages as have been described in detail with reference to a method according to the invention and a food processor according to the invention. In addition, a computer program product according to the invention may also be suitable for being read out and/or executed by a processing device of a food processor according to the invention, in particular in order to carry out the method according to the invention. A computer program product according to the invention is for example firmware which is preferably used for operating the food processor according to the invention and/or can be digitally transferred to the food processor or the storage unit and/or processing device. Furthermore, the computer program product according to the invention may also be configured as a digital storage medium, in particular as a flash memory and/or a digital optical storage medium such as a CD and/or DVD and/or Blu-ray.

It may also be provided within the scope of the invention that (in particular by the monitoring device) at least during the preparation mode and/or in the case of a preparation to be recorded (of the preparation or the operations mode) a preparation recording of the preparation is performed or created. For this purpose, further acquisition values and/or further recordings of the prepared food and/or at least one control value and/or at least one result value are identified (during the preparation) (for example repeatedly and/or cyclically and/or as a one-off). The at least one control value is identified for example by means of acquiring acquisition values of at least one control parameter, the control parameter being specific for the preparation (to be recorded). The at least one result value is identified for example by means of acquiring result values of at least one result parameter, the result parameter being specific for the result of the preparation and/or for the preparation. Subsequently, the identified control value and/or the identified result value can in particular be recorded in a preparation recording (e.g. in the form of digitally and/or persistently stored information), such that said recording is preferably assigned (in the form of a recorded preparation) to the preparation to be recorded. In this case, the acquisition value comprises for example at least one acquisition value and/or at least one recording of the prepared food. The control parameter comprises for example at least one acquisition variable and/or at least one variable and/or user input and/or the like that is acquired by a sensor of the food processor. The result value in particular comprises at least one acquisition value and/or at least one recording of the prepared food. The result parameter preferably comprises at least one acquisition variable and/or at least one user input and/or at least one variable that is acquired by a sensor of the food processor. In this case, the control parameter and the result parameter particularly preferably differ from one another. This is advantageous in that preparation can be recorded and in particular reproduced at a later timepoint. For this purpose, it is in particular possible for the control parameters, which are used in particular for controlling the preparation, to be acquired as comprehensively and/or completely as possible and to preferably be able to be recorded and/or reproduced by the control values. In this case, the result value and/or the result parameter is used in particular for recording and/or reproducing the result of the recorded preparation, e.g. a state of the prepared food.

In this case, the control parameter is in particular a parameter of the kind, in particular an acquisition variable of the kind, that comprises information regarding the specific preparation, in particular the control of the preparation and/or of a single preparation step of the preparation. The control parameter thus for example comprises information regarding a speed of a mixer of the food processor and/or a direction of rotation (e.g. anti-clockwise or clockwise rotation) of the mixer, and/or regarding a set temperature of a heating element or a heating means of the food processor, and/or regarding a preparation duration, in particular of a single preparation step. For example, when preparing fried onions the control parameter influences the degree of roasting of the onions because for example the temperature for heating the onions and/or the duration of the heating is determined thereby. In this case, the result parameter is preferably specific for the result of the preparation, e.g. the degree of roasting of the onions. The result parameter can therefore be, for example, a visual recording of the food, e.g. by means of a camera sensor, and/or another physical variable of the food processor, e.g. a motor current. For example the consistency of the food, such as whipped cream, can be checked on the basis of the motor current. It is also conceivable for the result parameter to relate to user input, e.g. for shortening the preparation time. It may be possible, for example, for the preparation time specified by the recipe to be shortened by means of user input when the desired degree of roasting is achieved. Accordingly, the result parameter, for example, may comprise a user-specific adjustment of this kind. It is also conceivable for the result parameter to relate to an adjustment owing to acquired environmental parameters, which adjustment is performed automatically for example, in order to optimize the preparation under different environmental conditions.

It may furthermore be possible that, in order to reproduce the recorded preparation, the preparation recording is first evaluated, in particular when a further preparation mode is initiated for a further preparation, and preferably when a recipe selection is made. Furthermore, a control signal can subsequently be emitted, in particular on the basis of the evaluation and/or of the preparation recording, such that the further preparation takes place in a manner adjusted to the preparation recording. In particular, the result of the recorded preparation and/or at least one preparation step of the recorded preparation and/or a curve of control parameters of the recorded preparation can thus be reproduced.

Further advantages, features and details of the invention can be found in the following description, in which embodiments of the invention are described in detail with reference to the drawings. In this case, the features mentioned in the claims and in the description may in each case be essential to the invention alone or in any desired combination. In the drawings:

In the following Figures, identical reference signs are used for the same technical features, even in different embodiments.

Figure 1:
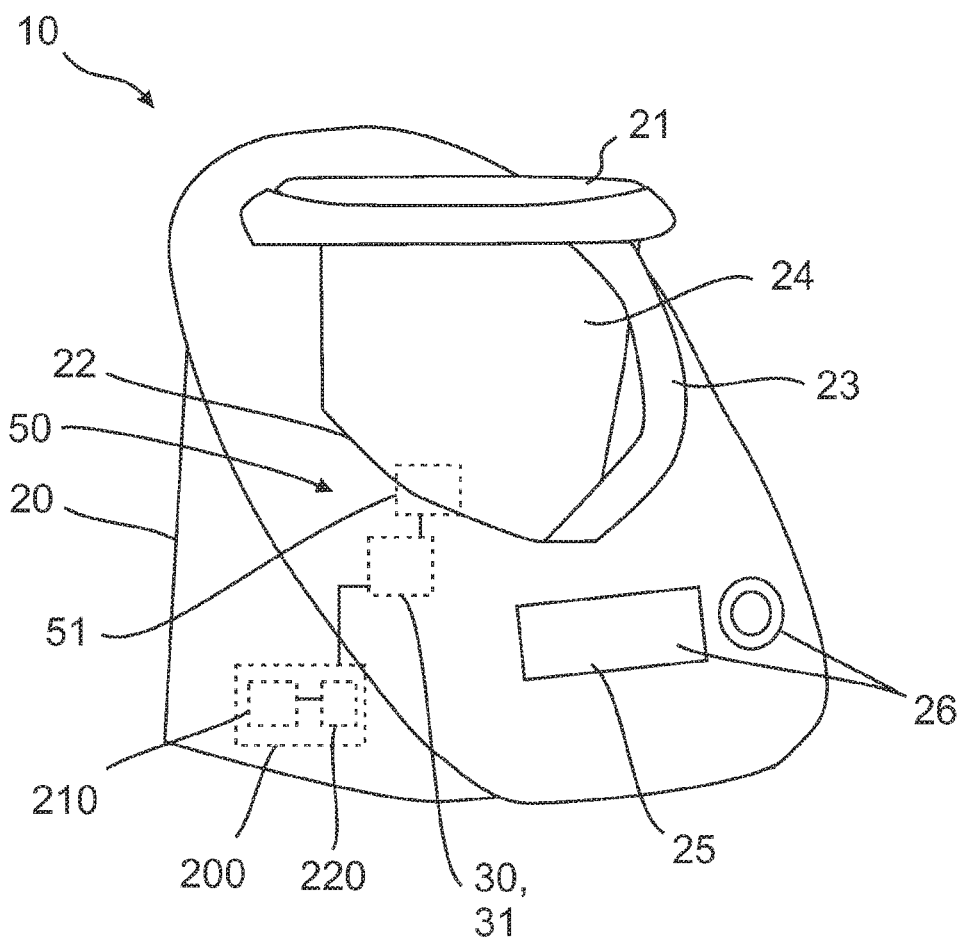
FIG. 1 is a schematic view of a food processor according to the invention.
Figure 2:
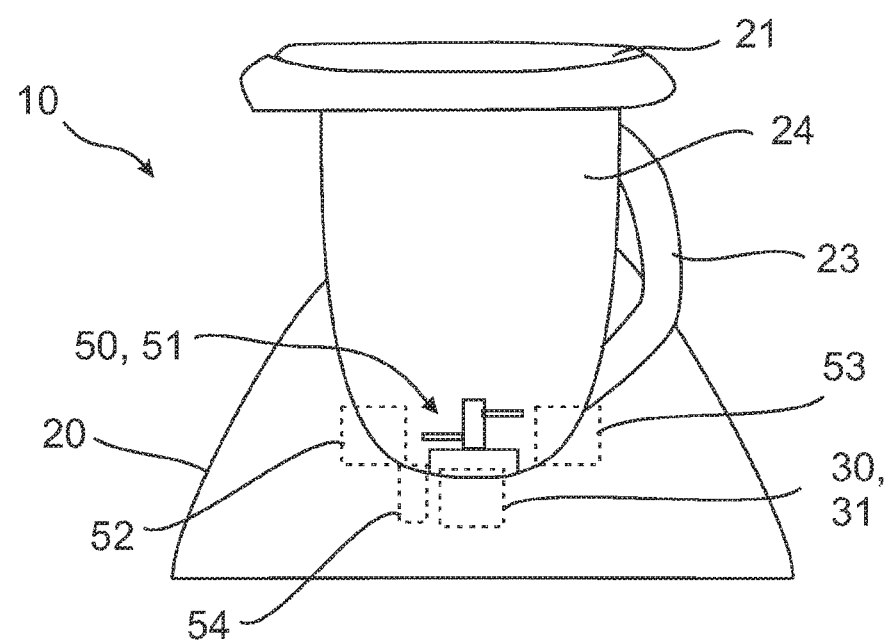
FIG. 2 is a further schematic view of a food processor according to the invention.

A food processor 10 according to the invention is shown schematically in FIGS. 1 and 2. The food processor 10 comprises a housing 20 which comprises a holder 22 for a mixing vessel 24. In this case, the mixing vessel 24 can for example be closed by a lid 21 and preferably comprises a handle 23. A mixer 51 and/or a heating element 53 and/or a sensor 52 is preferably arranged in the region of the mixing vessel 24 and/or in the inside of the mixing vessel 24. Moreover, the food processor 10 comprises a control panel 26 which for example comprises a display 25, preferably a touchscreen 25. In this case, the display 25 is used in particular both as an input means and as an output means. The control panel 26 in particular enables for a user of the food processor 10 to set and/or activate and/or deactivate operating parameters, such as the mixer speed, the heating temperature and/or the time period for the preparation or the mixing process, and/or different programs of the food processor 10. Furthermore, the display 25 can also output recipe-related instructions and/or advice and/or graphical operating elements. The food processor 10 according to the invention can be operated by means of the graphical operating elements, as input means, which elements are preferably part of a graphical user interface. The recipes are for example stored in a non-volatile memory 220 of the food processor 10. In particular, the input means also allows for a preparation mode to be activated and/or deactivated, and/or for the type of preparation, and/or the type of food to be prepared, to be set.

As shown in FIGS. 1 and 2, the food processor 10 comprises at least one processing device 50, which in particular comprises at least one processing tool 51, such as a mixer 51. For the purpose of monitoring and/or control 160, in particular of the processing devices 50, at least one monitoring device 200 is furthermore provided, which device for example comprises a processing device 210 and/or the memory 220. It may furthermore be possible for the processing device 50 and/or further processing devices 50 to comprise at least one sensor 52 and/or a heating means 53 and/or scales 54 which are integrated in the food processor 10 for example. The scales 54 are used in particular for acquiring or measuring a weight force on the mixing vessel 24. For this purpose, the object to be weighed is for example placed on and/or poured into the mixing vessel 24. The heating means 53 is for example designed such that the food can be heated in the mixing vessel 24 by the heating means 53, preferably up to temperatures in a range of from 10° C. to 150° C., preferably 30° C. to 120° C.

FIG. 2 furthermore schematically shows a drive means 30 of the food processor 10, which drive means comprises an (electric) motor 31. In this case, the drive means 30 and/or the motor 31 is connected to at least one processing device 50 and/or to at least one processing tool 51, in particular the mixer 51, such that force transmission takes place from the motor 31 and/or a drive shaft of the drive means 30 to the processing device 50 and/or the processing tool 51 and/or the mixer 51. It may be possible for the monitoring device 200 to be electrically connected at least to the sensor 52 and/or to the processing device 50 and/or to the drive means 30 and/or to the motor 31 of the drive means 30 for the purpose of monitoring.

Figure 3:
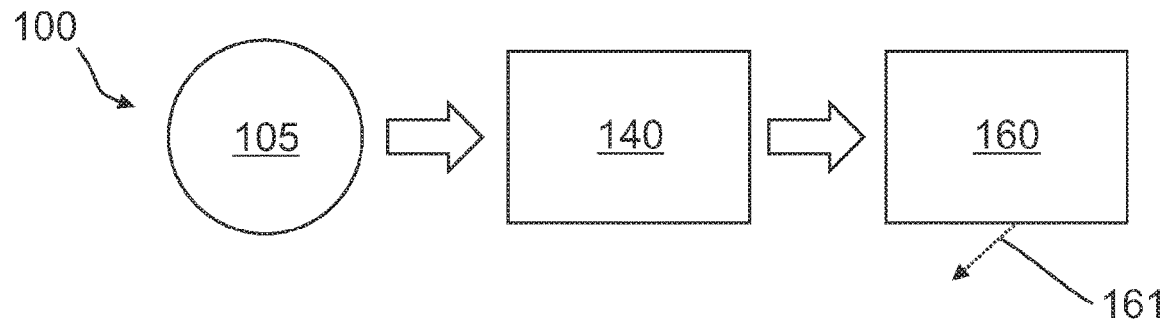
FIG. 3-4 are schematic views for illustrating a method according to the invention, FIG. 5 a schematic representation of an acquisition value curve, in particular of non-filtered acquisition values, FIG. 6 a schematic representation of an acquisition value curve, in particular of filtered acquisition values, FIG. 7 a further schematic representation of the acquisition value curve (motor signal (M) vs. time (t)), in particular of the filtered acquisition values, and FIGS. 8-11 schematic representations for illustrating a time-dependent analysis.

FIG. 3 schematically illustrates a method 100 according to the invention. In this case, according to a first method step, at least one acquisition 105 is performed on the food processor 10. In this case, the acquisition 105 identifies temporally successive acquisition values 106, the acquisition values 106 being specific for at least one preparation parameter, of the food processor 10, i.e. for example proportional to the motor current of the motor 31 of the drive means 30 of the food processor 10. Subsequently, a time-dependent analysis 140 of at least one item of analysis information is carried out, wherein the analysis information is determined on the basis of the temporally successive acquisition values 106. In this case, an analysis result of the time-dependent analysis 140 influences a control operation 160, in particular of the processing device 50. In this case, at least one control signal 161 is emitted, on the basis of the analysis result, which signal influences the preparation mode, i.e. for example the operation of the processing device 50. In this case, the control signal 161 is emitted for example by a processing device 210 and/or by the monitoring device 200 and/or by a control device (not shown).

Figure 4:
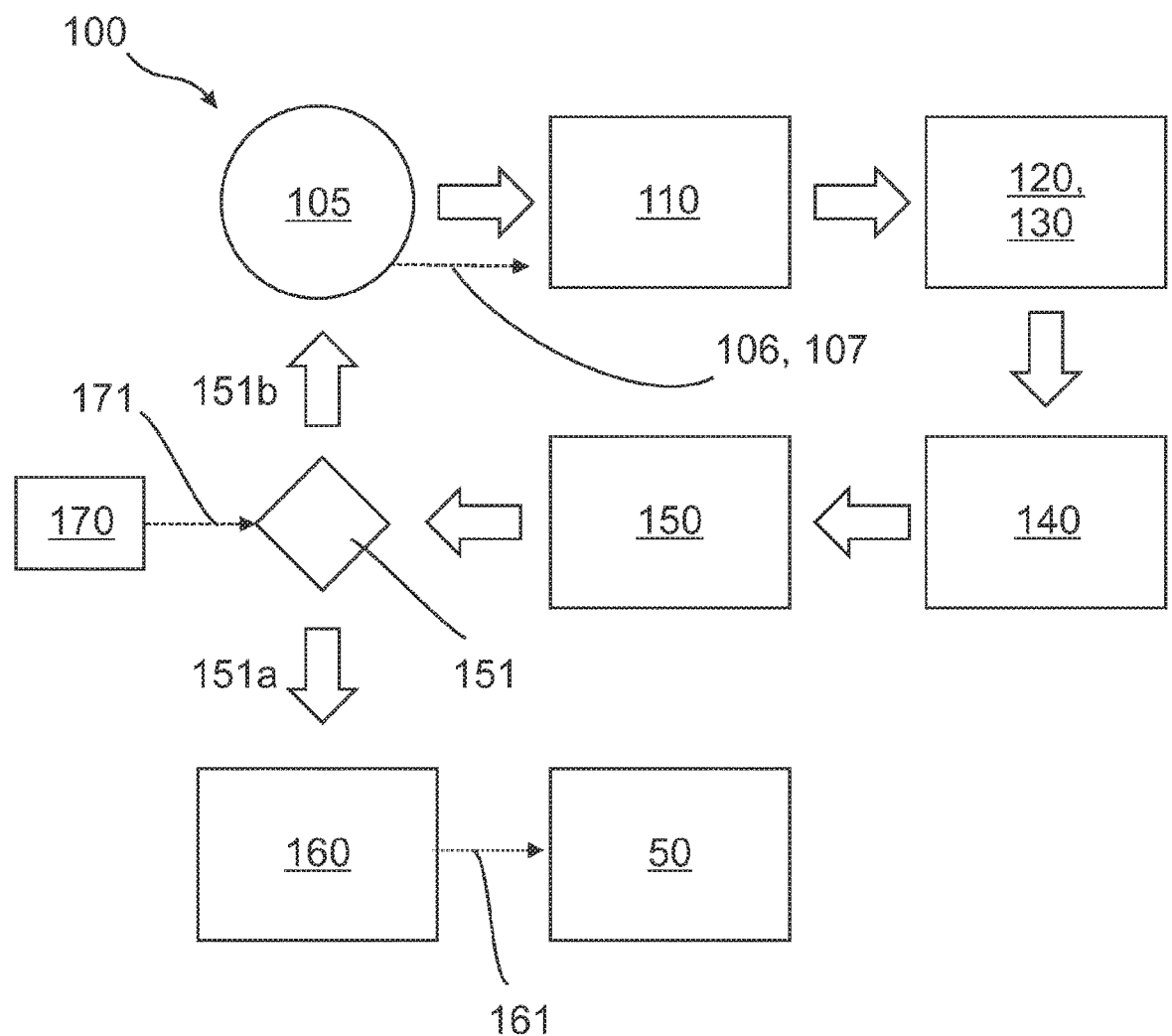

FIG. 4 schematically illustrates further method steps of a method 100 according to the invention. Following an acquisition 105 for identifying the acquisition values 106, the acquisition values 106 undergo further signal processing in order to determine analysis information as a result thereof. During the signal processing, filtering 110 of the identified (unfiltered) acquisition values 106, 106a is first performed, as a result of which the filtered acquisition values 106b are determined. This enables to smooth the time curve 107 of the acquisition values 106. Subsequently, it may be possible for evaluation 120 of the filtered acquisition values 106b to be performed, preferably generation of features 121 and/or feature evaluation 130. In order to evaluate the features 130, it is possible for example to compare the generated features 121 with a threshold value 171 and/or to perform a frequency analysis. A time-dependent analysis 140 can for example be performed on the basis of the generated features 121 and/or on the basis of the filtered acquisition values 106b and/or on the basis of the unfiltered acquisition values 106a, preferably a frequency analysis, whereby an analysis result is determined. A positive or negative decision result 151 is determined on the basis of this analysis result of the time-dependent analysis 140, a decision 150 being carried out for this purpose. In particular, a positive decision result 151a is determined only when the analysis result indicates a (desired) specified future preparation state, for example an optimal completion time of the preparation. In this case, in the event of a negative decision result 151b, the preparation mode is not influenced and/or no control signal 161 is emitted. In other words, the preparation of the food continues as normal in the preparation mode. In particular, however, there can moreover also be further termination conditions for the preparation mode, such that the preparation mode is automatically deactivated for example when a maximum time period of the preparation mode is exceeded, irrespective of the analysis result. After the negative decision result 151b has been determined, at least one acquisition 105 and/or one time-dependent analysis 140 is performed again (for example automatically and/or after a specified time period and/or cyclically). However, if a positive decision result 151a is determined, the processing device 50 is controlled 160, by means of a control signal 161 being emitted, in order to influence the preparation mode. In order to carry out the decision 150, in addition at least one threshold value 171 can also be consulted for the plausibility check 170.

Figure 5:
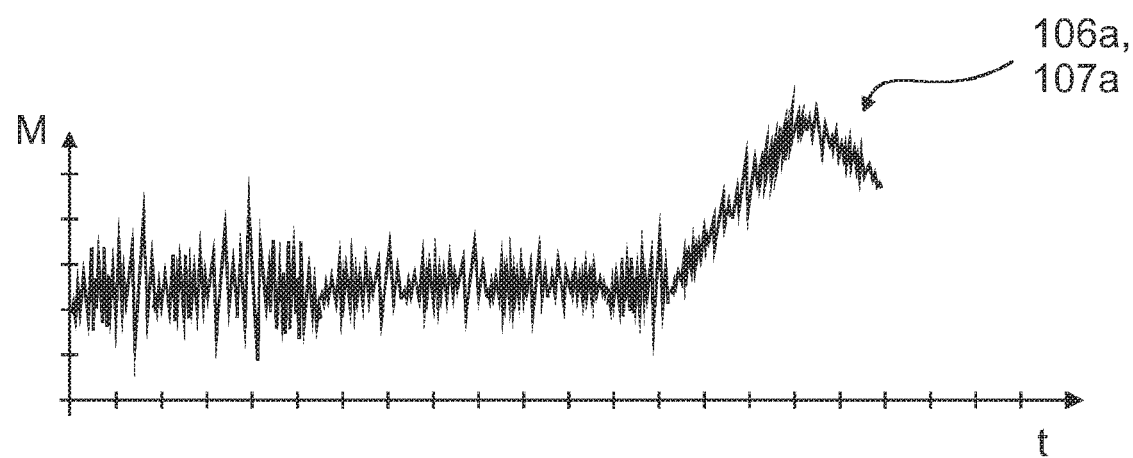
Figure 6:
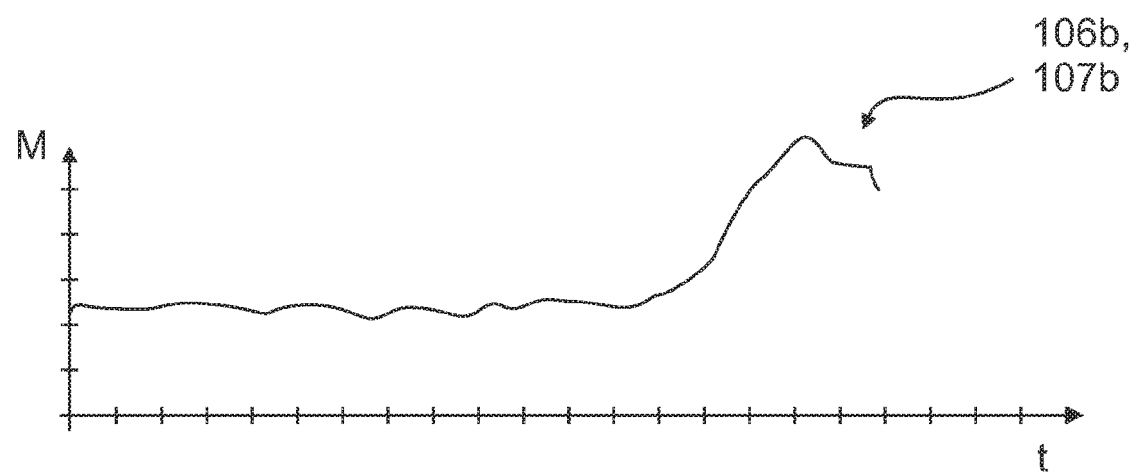

FIG. 5 schematically shows a non-filtered curve 107a of non-filtered acquisition values 106a. The nonfiltered acquisition values 106a are identified by acquisition 105 of a measuring variable M, such as a motor signal, and are shown as a curve 107 plotted against the time t. In this case, the high-frequency change and/or disturbance of the acquisition values 106 can be clearly discerned. For smoothing the non-filtered acquisition values 106a, a filtering 110 can be performed, whereby filtered acquisition values 106b or a filtered temporal course or time curve 107b are identified. The filtered curve 107b is schematically shown in FIG. 6. The filtering enables an improves and more reliable evaluation of the acquisition values 106, e.g. by the time-dependent analysis.

Figure 7:
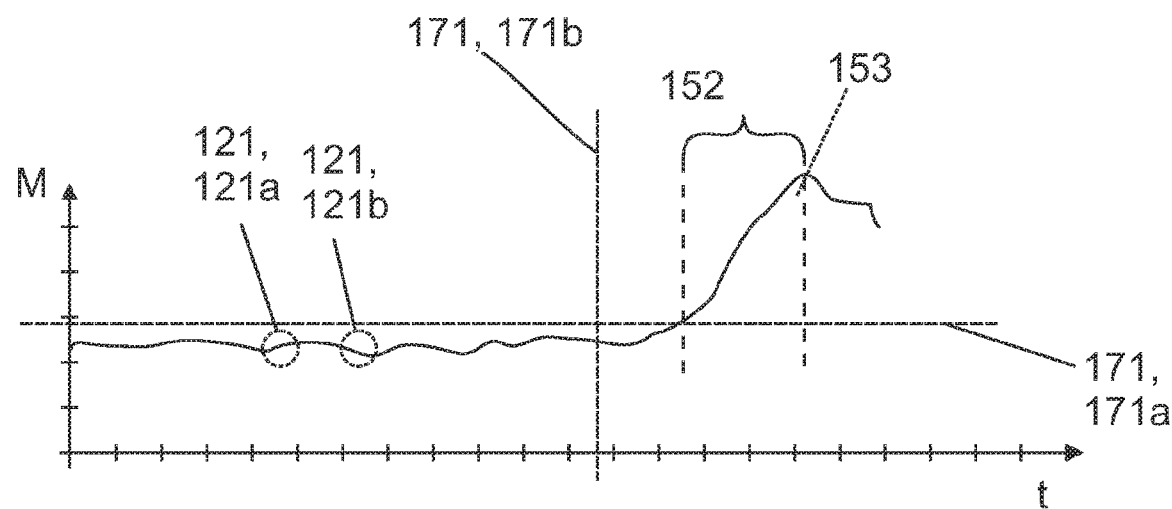
Figure 8:
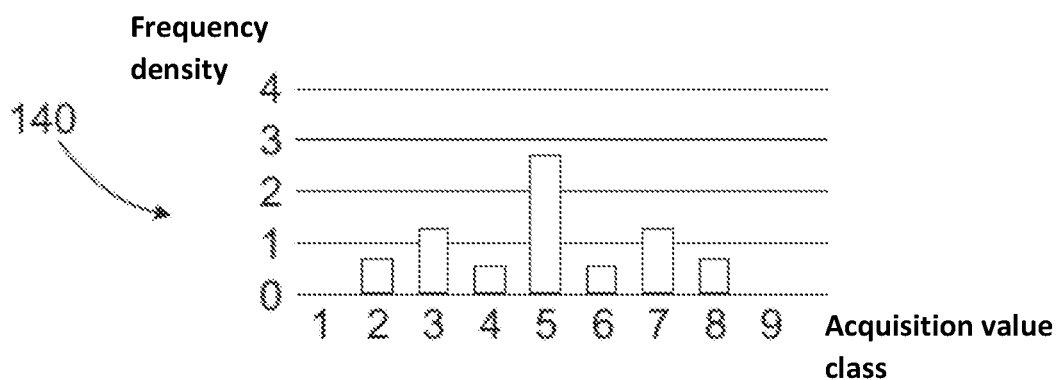

FIG. 7 shows a typical time curve 107, in particular filtered curve 107b, of the acquisition values 106, for example for the preparation of whipped cream. The filtered acquisition values 106b shown are dependent for example on a motor signal as the measuring variable M. It can be seen that initially (up to the second threshold value 171b), only minor fluctuations occur, and a steady trend can thus be identified. The features 121 can be generated for example by means of a difference and/or a gradient of the acquisition values 106 being determined. A feature evaluation 130 then makes it possible, for example, for the generated feature 121 to be used for identifying a specific pattern in the curve 107. For this purpose, the time-dependent analysis 140 for example can also be performed on the basis of the acquisition values 106 and/or generated features 121. In this case, the threshold values 171 can be used to check the plausibility 170 of the analysis result. The threshold values 171 are in particular defined empirically, such that for example a second threshold value 171b specifies the timepoint at which the desired preparation state (e.g. the desired consistency of the whipped cream) occurs at the earliest. In this case, a curve pattern 152 can be identified in the marked range 152 that indicates the desired timepoint of the preparation. In this case, the occurrence of the curve pattern 152, i.e. for example the specific change in the gradient and/or the trend, results in particular from the influence of the food on the processing device 50. It is thus possible, for example, for the consistency, which has changed owing to the preparation, to cause a mixing resistance to increase or decrease and thus the motor current of the electromotor 31 for the mixer 51 to increase or decrease accordingly. The acquisition values 106 are therefore dependent on the preparation (for example the mixing resistance, and the curve pattern 152 of the acquisition values 106 can thus be used in particular for evaluating the preparation and/or consistency. The curve pattern 152 is for example empirically pre-defined. It may be possible for a comparison specification such as the curve pattern 152 to be acquired by means of the time-dependent analysis 140 and/or the process of carrying out the decision 150. Detection of the curve pattern 152 then allows for early prediction of a critical point 153 at which the desired preparation state occurs. In particular, the steps of the method 100 according to the invention can be adjusted and/or temporally defined for example by means of a real-time requirement, such that the control signal 161 is emitted in due time, despite an evaluation latency period, in order to influence and/or deactivate the preparation mode when the desired state or the critical point 153 has been temporally reached.

It can be seen in FIG. 7 that the acquisition values 106, in particular the filtered curve 107*b*, to be able to be consulted for generating 120 features in accordance with an evaluation 120. It is thus possible to generate, for example, a first generated feature 121*a* and a second generated feature 121*b* by means of the evaluation 120. The first generated feature 121*a* in this case indicates for example a rise (i.e. a positive difference), and the further generated feature 121*b* in this case indicates for example a drop (i.e. a negative difference). It is furthermore possible for a comparison specification, in particular a curve pattern 152, in the curve pattern 107 to be detected by means of the feature evaluation 130 and/or the time-dependent analysis 140. For this purpose, a histogram is evaluated for example. As shown in FIG. 7, the curve pattern 152 (on the basis of the prepared food) corresponds for example to a continuous increase in the acquisition values 106 over a specified phase. Depending on the food, a first comparison specification, such as a first curve pattern 152, may exhibit a continuous rise in the acquisition values 106, and a second comparison specification, such as a second curve pattern 152, may exhibit a continuous drop in said values. On the basis of a user setting, the corresponding first or second comparison specification is then taken into account. Furthermore, at least one threshold value 171 can be taken into account, whereby e.g. only acquisition values 106 are considered in a certain value range and/or only a specific time interval of the acquisition values 106 is taken into account.

A plausibility check 170 of the analysis result, in particular also the definition of the value range of the acquisition values 106 for carrying out the decision 150, is made possible by the threshold values 171. The threshold value 171 in particular comprises at least one first threshold value 171, 171*a*, which is shown by a dashed horizontal line in FIG. 7. A decision is carried out 150 and/or a positive decision result 151*a* is determined only when the acquisition values 106 currently identified are above the first threshold value 171, 171*a*. A second threshold value 171, 171*b* preferably enables to define the period of time for carrying out the decision 150, which second threshold value is shown by a vertical dashed line. Correspondingly, a decision is carried out 150 and/or a positive decision result 151*a* is determined only when the temporal duration of the preparation mode temporally exceeds the second threshold value 171*b*.

Figure 9:
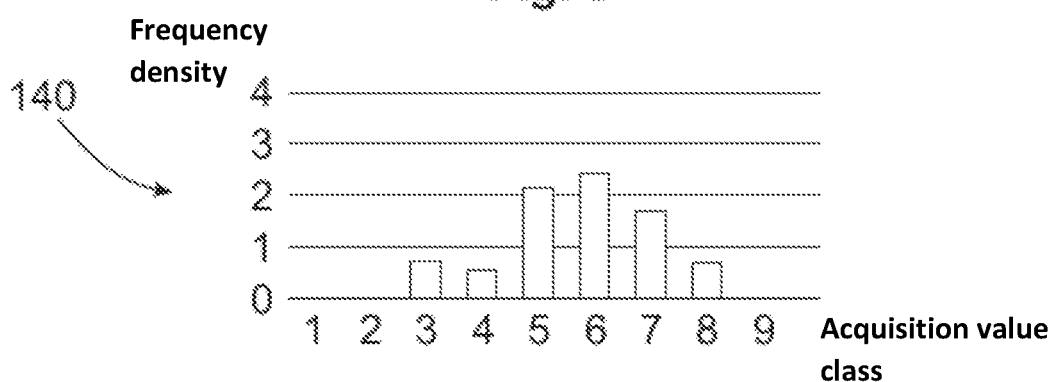
Figure 10:
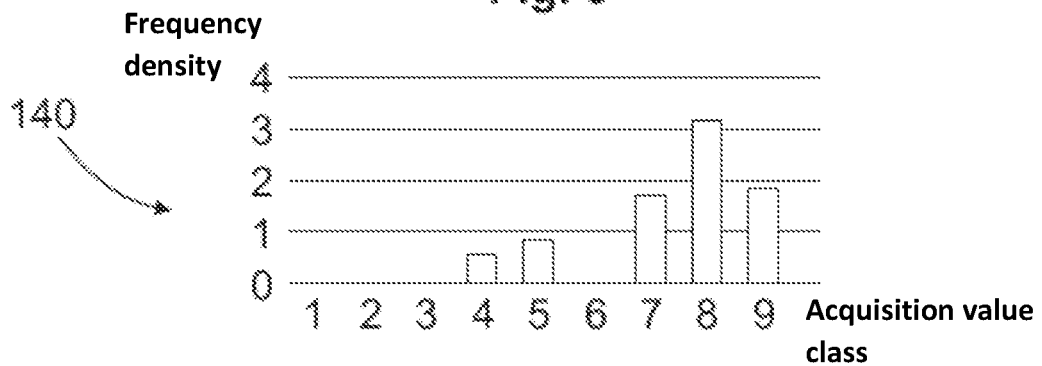
Figure 11:
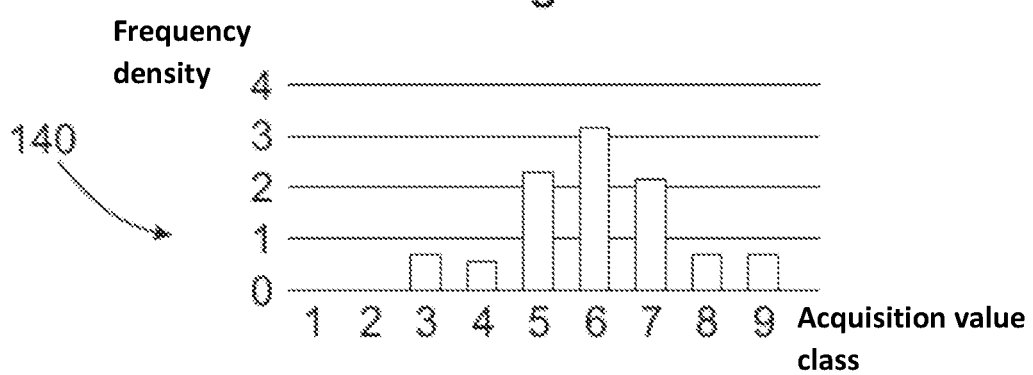

FIGS. 8 to 11 schematically illustrate the procedure for a determination of the frequency distribution and/or for a time-dependent analysis 140, in particular for a frequency analysis. FIGS. 8 to 11 show a time-progressive course of the frequency distribution. To that end, analysis values, in particular acquisition values 106, are assigned to different classes, which are represented by numbers 1 to 9 of the horizontal axis. (Higher-value numbers for example correspond to higher value ranges of the individual classes). The analysis values are for example differences of adjacent acquisition values 106 or the respective gradient of the acquisition values 106, respectively. Each analysis value is for example assigned to the class in the value range of which the analysis value lies. Thereafter or prior to this, the frequency density is determined, represented by numbers 0 to 4 of the vertical axis. This way, a frequency distribution of the different frequency densities is determined via the classes 1 to 9, and is discernible in FIGS. 8 to 11. This process is repeated cyclically during the preparation mode, so that a temporal course of the determined frequency density and/or a characteristic value, in particular a focus of the frequency distribution can be identified for various time points. It is obvious that the focus of the distribution in FIG. 9 is located farther on the right (at the higher classes) when compared to FIG. 8. Another movement of the focus towards higher classes can be seen in FIG. 10, so that using the focus or the focus maximum (in FIG. 10, for example), a significant rise of the temporal course 107 of the acquisition values can be detected. This course can for example be used for detecting a comparison specification, such as a temporal course pattern 152, which is specific for a determined preparation state. As a condition for the output of a positive decision result 151*a*, it can for example be provided that a temporal shift of the focus beyond a certain threshold is detected, for example according to FIG. 10. Alternatively or in addition, it can be provided that as a condition for the determination of a positive decision result 151*a*, a certain temporal course pattern 152 is detected. The (first) comparison specification and/or the (first) temporal course pattern 152, for example include a defined first course of the focus, in which after a maximum shift of the focus (according to FIG. 10) in a first direction, the shift of the focus declines again, i.e. takes place (according to FIG. 11) in a direction opposite to the first direction (e.g. towards lower classes of the histogram). This is why the (first) comparison specification is specific to a first food, e.g. whipped cream, in which for example the mixing resistance increases and/or the motor signal rises. Preferably, also a second comparison specification is provided, which is specific to a second food, such as rice. Here, the mixing resistance for example decreases, which (in contrast to the first food) has the motor signal dropping. The (second) comparison specification and/or the second (temporal) course pattern 152 therefore includes, for example, a second defined course, in which, after a maximum shift of the focus in the opposite direction, the shift of the focus declines again, i.e. takes place in the first direction (e.g. towards higher classes of the histogram).

The above explanation of the embodiments describes the present invention merely within the context of examples. Of course, individual features of the embodiments can, insofar as technically reasonable, be combined with one another as desired without departing from the scope of the present invention.

LIST OF REFERENCE CHARACTERS

10 food processor
20 housing
21 lid
22 mixing vessel holder
23 handle 24 mixing vessel
25 display
26 control panel
30 drive means
31 motor
50 processing device
51 processing tool, mixer
52 sensor
53 heating element
54 scales
100 method
105 acquisition
106 acquisition values
106a unfiltered acquisition values
106b filtered acquisition values
107 curve
107a unfiltered curve
107b filtered curve
110 filtering
120 evaluation, generation of the features
121 generated feature
121a first generated feature
121b second generated feature
130 feature evaluation
140 time-dependent analysis
150 carrying out a decision
151 decision result
151a positive decision result
151b negative decision result
152 curve pattern
153 critical point
160 control
161 control signal
170 plausibility-check
171 threshold value
200 monitoring device
210 processing device
220 non-volatile memory
t time
M measuring variable

The invention claimed is:

1. A method for operating a food processor, wherein at least one processing device of the food processor is controlled, in a preparation mode, so as to at least partially automatically prepare food, wherein the processing device includes at least a mixer or a heating element, and wherein
a monitoring device
performs an identification of temporally successive acquisition values at the food processor at least during the preparation mode, wherein the acquisition values are specific to at least one preparation parameter of the food processor, wherein the acquisition values are identified by an acquisition of the at least one preparation parameter of the food processor, wherein the at least one preparation parameter includes at least one of the following parameters: a rotary speed of the processing device, a motor signal, which depends upon a torque of the mixer, and a temperature acquired at a prepared food in the food processor,
determines at least one analysis information dependent upon the temporally successive acquisition values, and
identifies a frequency distribution of the analysis information by a time-dependent analysis, which includes a histogram analysis, whereby
an analysis result specific to a preparation state is determined by the monitoring device, and
carries out a plausibility-check, the plausibility-check being based upon at least one empirically determined threshold value, wherein the threshold value is selected dependent upon a food provided for preparation, wherein the threshold value is evaluated by comparing the threshold value with the acquisition values,
wherein
dependent upon the analysis result, at least one control signal is emitted by the monitoring device for influencing the processing device in the preparation mode,
the at least one control signal is emitted only if the acquisition values are at least less than or equal to an upper threshold value or greater than a lower threshold value, and
influencing the processing device includes at least the activation or deactivation of at least the mixer or the heating element, setting the mixing speed of the mixer, or setting the temperature of the heating element.

2. A method according to claim 1, wherein the following steps are carried out:
a) filtering the identified acquisition values to achieve a smoothing,
b) generating at least one feature based upon the acquisition values,
c) determining the analysis information based upon at least one of the generated features or based upon the, identified acquisition values,
d) performing the time-dependent analysis of the analysis information, so that, dependent upon a temporal course of the acquisition values, the analysis result is determined,
e) determining a positive or negative decision result on the basis of the analysis result, and
f) outputting the control signal when the determined decision result is positive.

3. A method according to claim 1, wherein at least one of the acquisition values or the analysis information are time-buffered for the time-dependent analysis.

4. A method according to claim 1, wherein the identification of the frequency distribution is performed based upon at least one of the identified acquisition values or a generated feature.

5. A method according to claim 1, wherein by the time-dependent analysis, the analysis information is evaluated time-dependently in such a manner that a first value of the analysis information is compared with at least one of at least one second value or with all further values or with a comparison specification of the analysis information or frequency distribution, wherein the values are identified from at least one of the following data:
at least one filtered acquisition value,
at least one non-filtered acquisition value, and
at least one feature generated from the acquisition values.

6. A method according to claim 1, wherein a generation of a feature is effected based upon the identified acquisition values.

7. A method according to claim 1, wherein the preparation parameter additionally includes at least one of the following parameters:
a parameter of a drive, and
a measureable parameter of the prepared food.

8. A method according to claim 1, wherein for the identification of the acquisition values, at least one of an acquisition is performed, at an electronic component of the food processor, or the acquisition values are identified for electric parameters of the food processor.

9. A method according to claim 1, wherein at least one of a trend or a prediction of at least one of the identified acquisition values or features, or frequency distribution is determined.

10. A method according to claim 1, wherein the decision result is determined positive only if a predetermined temporal course pattern is detected.

11. A method according to claim 1, wherein the predetermined temporal course pattern is selected dependent upon a food provided for preparation.

12. A method according to claim 1, wherein the processing device having a mixer is controlled, in the preparation mode, to at least partially automatically prepare whipped cream.

13. A method according to claim 4, wherein the identification of the frequency distribution is performed based upon at least one of the identified acquisition values or a generated feature, in order to determine a trend of a temporal course of the acquisition values that indicates a future determined preparation state.

14. A method according to claim 9, wherein at least one of a trend or a prediction of the identified acquisition values or features, of generated features, or frequency distribution is determined.

15. A computer program product for operating a food processor,
wherein the computer program product is configured to perform a method for operating a food processor according to claim 1, wherein at least one processing device of the food processor is controlled, in a preparation mode, so as to at least partially automatically prepare food, and wherein
a monitoring device performs an identification of temporally successive acquisition values at the food processor at least during the preparation mode, wherein the acquisition values are specific to at least one preparation parameter of the food processor,
wherein
at least one analysis information is determined dependent upon the temporally successive acquisition values, and
a frequency distribution of the analysis information is identified by a time-dependent analysis, whereby
an analysis result specific to a preparation state is determined, wherein
dependent upon the analysis result, at least one control signal is emitted for influencing the preparation mode.

16. A food processor comprising at least one processing device and at least one monitoring device, wherein
the processing device includes at least a mixer or a heating element, and at least one monitoring device comprising an electronic processing device, and
wherein the monitoring device is configured to perform:
an identification of temporally successive acquisition values at the food processor at least during the preparation mode, wherein the acquisition values are specific to at least one preparation parameter of the food processor, wherein the acquisition values are identified by an acquisition of the at least one preparation parameter of the food processor, wherein the at least one preparation parameter includes at least one of the following parameters: a rotary speed of the processing device, a motor signal, which depends upon a torque of the mixer, and a temperature acquired at a prepared food in the food processor,
a determination of at least one analysis information dependent upon the temporally successive acquisition values, and
an identification of a frequency distribution of the analysis information by a time-dependent analysis, which includes a histogram analysis, whereby the monitoring device determines an analysis result specific to a preparation state, and
a plausibility-check, the plausibility-check being based upon at least one empirically determined threshold value, wherein the threshold value is selected dependent upon a food provided for preparation, wherein the threshold value is evaluated by comparing the threshold value with the acquisition values,
wherein dependent upon the analysis result, at least one control signal is emitted by the monitoring device for influencing the processing device in the preparation mode,
the at least one control signal is emitted only if the acquisition values are at least less than or equal to an upper threshold value or greater than a lower threshold value, and
influencing the processing device includes at least the activation or deactivation of at least the mixer or the heating element, setting the mixing speed of the mixer, or setting the temperature of the heating element.

17. A food processor according to claim 16, wherein the processing device comprises at least one drive and a processing tool, which can be operated by the drive.

18. A food processor according to claim 16, wherein at least one of the processing device or the monitoring device is integrated in the food processor.

* * * * *